United States Patent [19]
Deguchi et al.

[11] Patent Number: 6,083,139
[45] Date of Patent: Jul. 4, 2000

[54] HYBRID DRIVE SYSTEM FOR VEHICLE WITH CLUTCH CONTROL

[75] Inventors: Yoshitaka Deguchi, Kanagawa; Hiroyuki Itoyama, Yokohama; Yasuhiko Kitajima, Kanagawa, all of Japan

[73] Assignee: Nissan Motor Co., Ltd., Yokohama, Japan

[21] Appl. No.: 09/346,530

[22] Filed: Jul. 2, 1999

[30] Foreign Application Priority Data

Jul. 3, 1998 [JP] Japan .................................. 10-189394

[51] Int. Cl.$^7$ .................................................... B60K 41/02
[52] U.S. Cl. .................................. 477/5; 477/174; 477/3; 180/65.2
[58] Field of Search ..................... 477/5, 6, 7, 8, 477/3, 174, 175, 176, 181; 180/65.2

[56] References Cited

U.S. PATENT DOCUMENTS

| | | | |
|---|---|---|---|
| 4,335,429 | 6/1982 | Kawakatsu | 180/65.2 X |
| 5,492,189 | 2/1996 | Kriegler et al. | 180/65.2 X |
| 5,735,770 | 4/1998 | Omote et al. | 477/5 |
| 5,771,478 | 6/1998 | Tsukamoto et al. | 477/8 X |
| 5,993,351 | 11/1999 | Deguchi | 477/5 |

Primary Examiner—Charles A Marmor
Assistant Examiner—Ankur Parekh
Attorney, Agent, or Firm—Foley & Lardner

[57] ABSTRACT

A hybrid drive system for a vehicle comprises a first electric motor in driving relationship to at least one driven wheel, a heat engine, a second electric motor in driving connection to the engine, and a clutch to engage and disengage the engine to and from the driven wheel. Immediately after or upon a command to engage the clutch, a controller retrieves, based on a measure of speed of the driven wheel, data of maximum input torque, which the second motor is capable of absorbing from the engine and data of maximum output torque, which the first motor is capable of producing. The controller compares the torque request command with the retrieved data and selects one of a plurality of different protocols for operation of the first and second electric motors and the heat engine.

21 Claims, 11 Drawing Sheets

FIG.4
FIRST PROTOCOL

FIG.6
THIRD PROTOCOL

FIG.7
FOURTH PROTOCOL

FIG.8

FIRST PROTOCOL

SECOND PROTOCOL

THIRD PROTOCOL

HYBRID DRIVE SYSTEM FOR VEHICLE WITH CLUTCH CONTROL

FIELD OF THE INVENTION

The present invention relates to hybrid drive systems for vehicles, and more particularly to hybrid drive systems with clutch control.

BACKGROUND OF THE INVENTION

There exists much effort in addressing the basic need for an efficient power source. One such effort is a hybrid drive system including an electric motor in driving relationship with at least one driven wheel, a fuel powered heat engine, and a clutch to engage and disengage the engine to the driven wheel. The clutch may be disposed between the engine and the electric motor. To provide a shock free engagement of the engine to the driven wheel in all travel situations would require operating the engine and the electric motor in cooperation with operation of the clutch after a command to engage the clutch.

SUMMARY OF THE INVENTION

An object of the present invention is to provide a hybrid drive system wherein a fuel powered heat engine is engaged to driven wheel in a shock free manner.

According to one aspect of the present invention, there is provided a hybrid drive system for a vehicle, comprising:

at least one driven wheel;

a first electric motor having a first rotor in driving relationship to said driven wheel;

a fuel powered heat engine having an engine drive shaft;

a second electric motor having a second rotor in driving connection to said engine drive shaft, a clutch to engage and disengage said heat engine to and from said driven wheel; and a controller for translating the vehicle operator's torque request demand into operation of said first electric motor, said second electric motor and said clutch in response to a command to engage said clutch.

According to further aspect of the present invention, there is provided a hybrid drive system for a vehicle, comprising:

at least one driven wheel;

a first electric motor having a first rotor in driving relationship to said driven wheel via a transmission;

a fuel powered heat engine having an engine drive shaft;

a second electric motor having a second rotor in driving connection to said engine drive shaft, a clutch between said engine drive shaft and said first rotor; and a controller for generating a command to engage said clutch in response to the vehicle operator's torque request demand and the vehicle speed, comparing the vehicle operator's torque request demand with the maximum input torque by said second electric motor and the maximum output torque by said first electric motor, and controlling operation of the procedure of engagement of said clutch beginning with said command in response to result from said comparison.

DESCRIPTION OF THE PREFERRED EMBODIMENTS

Figure 1:
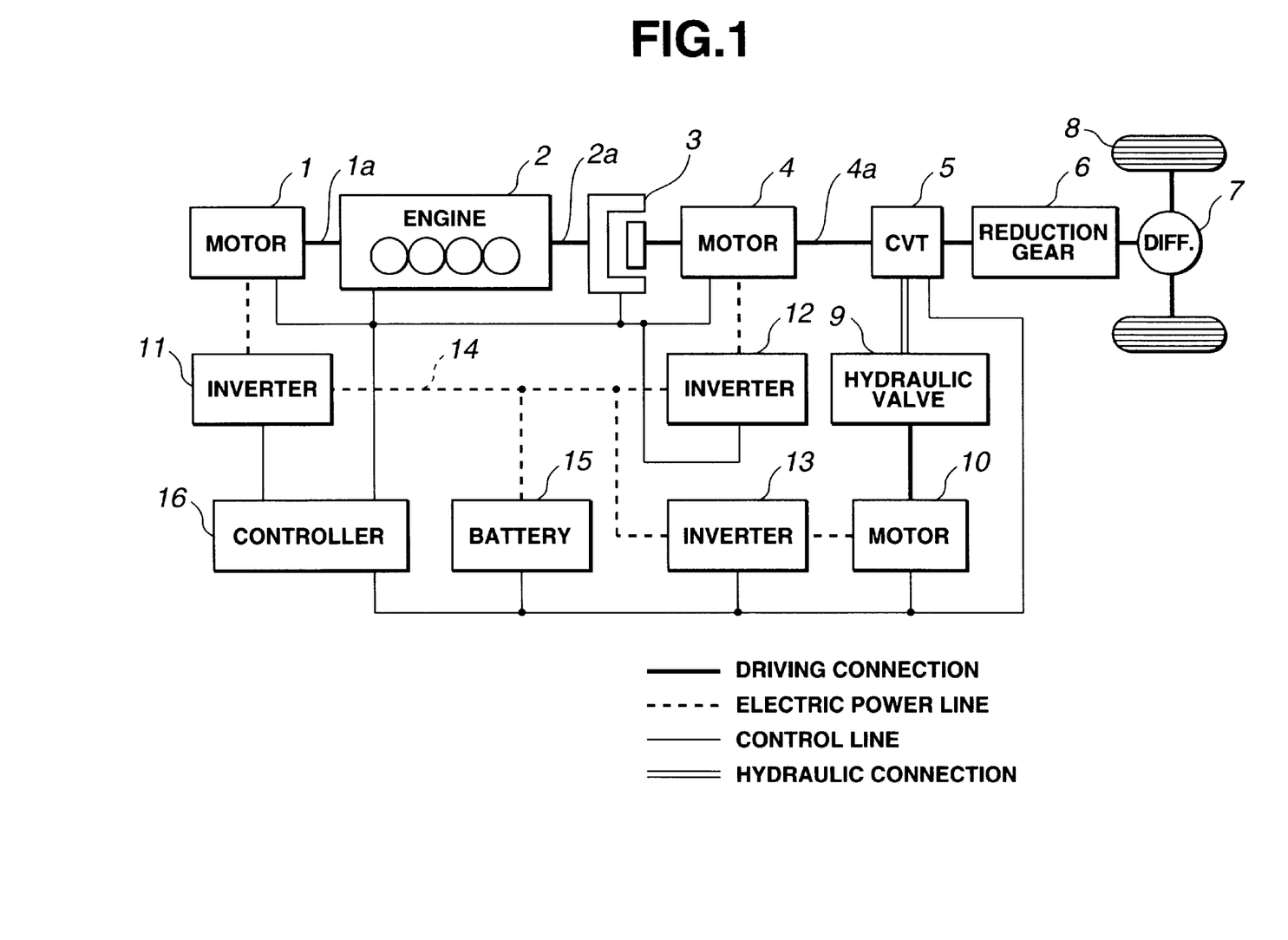
FIG. 1 is a generalized block diagram of a hybrid drive system for a vehicle.

An embodiment of a hybrid drive system according to the present invention is shown in FIG. 1. For simplicity in showing, the various elements are not shown in their physical relationships. The implementation of this invention can be used to power an automobile, truck, etc.

First, second and third electric motors 4, 1 and 10 are electrically connected to inverters 12, 11 and 13, respectively, which are connected to a controller 16. In the preferred embodiment, the first, second and third electric motors 4, 1 and 10 are three phase AC motors, however, it should be appreciated that other types of electric motors may be used, for example multi-pole DC permanent magnet motors. In the latter case, DC/DC converters are used instead of inverters.

The inverters 12, 11 and 13 are electrically connected by DC link 14 to a main battery pack 15 for charging the battery pack during generator mode and powering the motors 4, 1 and 10 during motor mode. The inverters 12, 11 and 13 are electrically interconnected by DC link 14 for allowing direct supply of current generated by one motor in generator mode to power another motor in motor mode bypassing the battery pack 15. In the preferred embodiment, the battery 15 is a lithium ion battery, however, it should be noted that other types of battery may be used, for example nickel hydrogen battery or copper battery. A power capacitor, for example an electric dual layer capacitor may be used as the battery pack 15.

The first motor 4 has a rotor 4a in driving relationship with at least one driven wheel 8 of a vehicle. In particular, the first motor 4 is coupled via a continuously variable transmission (CVT) 5 to the vehicle drive transmission that includes a reduction gear 6 and a differential 7. The CVT 5 can change ratio continuously. In the preferred embodiment, the CVT 5 includes an input pulley, an output pulley, an input shaft, an output shaft, a V-belt, and a hydraulic control unit 9. The input pulley is mounted to the input shaft and the output pulley is mounted to the output shaft. The V-belt interconnects the input and output pulleys. The rotor 4a of the first motor 4 is drivingly connected to the input shaft of the CVT 5. The output shaft of the CVT 5 is drivingly connected to the reduction gear 6. It should be appreciated that other type of CVT may be used, for example hydrostatic and friction CVTs. The third motor 10 is used to drive an oil pump within the hydraulic control unit 9.

A fuel powered heat engine 2 has a drive shaft 2a. The second motor 1 has a second rotor 1a in driving connection to the engine drive shaft 2a. In the preferred embodiment, a chain or belt provides the driving connection between the second rotor 1a of the second motor 1 and the engine drive shaft 2a. The engine drive shaft 2a is connected to a clutch 3 to engage and disengage the engine 2 to and from the driven wheel 8. The clutch 3 is positioned between the engine drive shaft 2a and the first rotor 4a of the first motor 4. The clutch 3 is an electromagnetic powder clutch. Torque transmitted by the electromagnetic powder clutch 3 is proportional to flow of current to energize the clutch 3.

The controller 16 includes a microcomputer with peripheral equipment and various kinds of actuators. The controller 16 can perform speed control and torque control of the engine 2, control of torque transmission by the clutch 3, speed control and torque control of the first, second and third motors 4, 1 and 10, and ratio control of the CVT 5.

Figure 2:
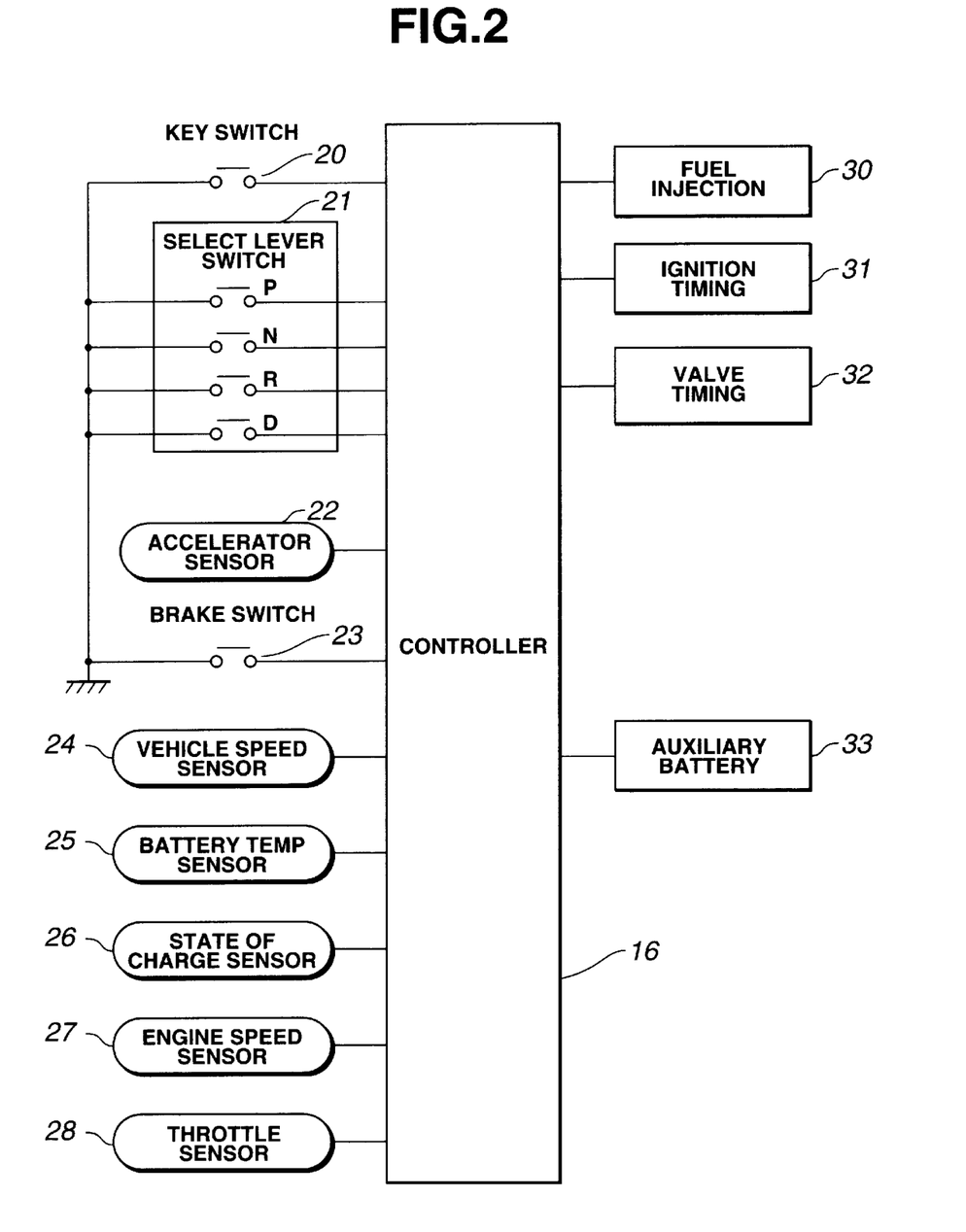
FIG. 2 illustrates major components positioned in the vehicle.
Figure 3:
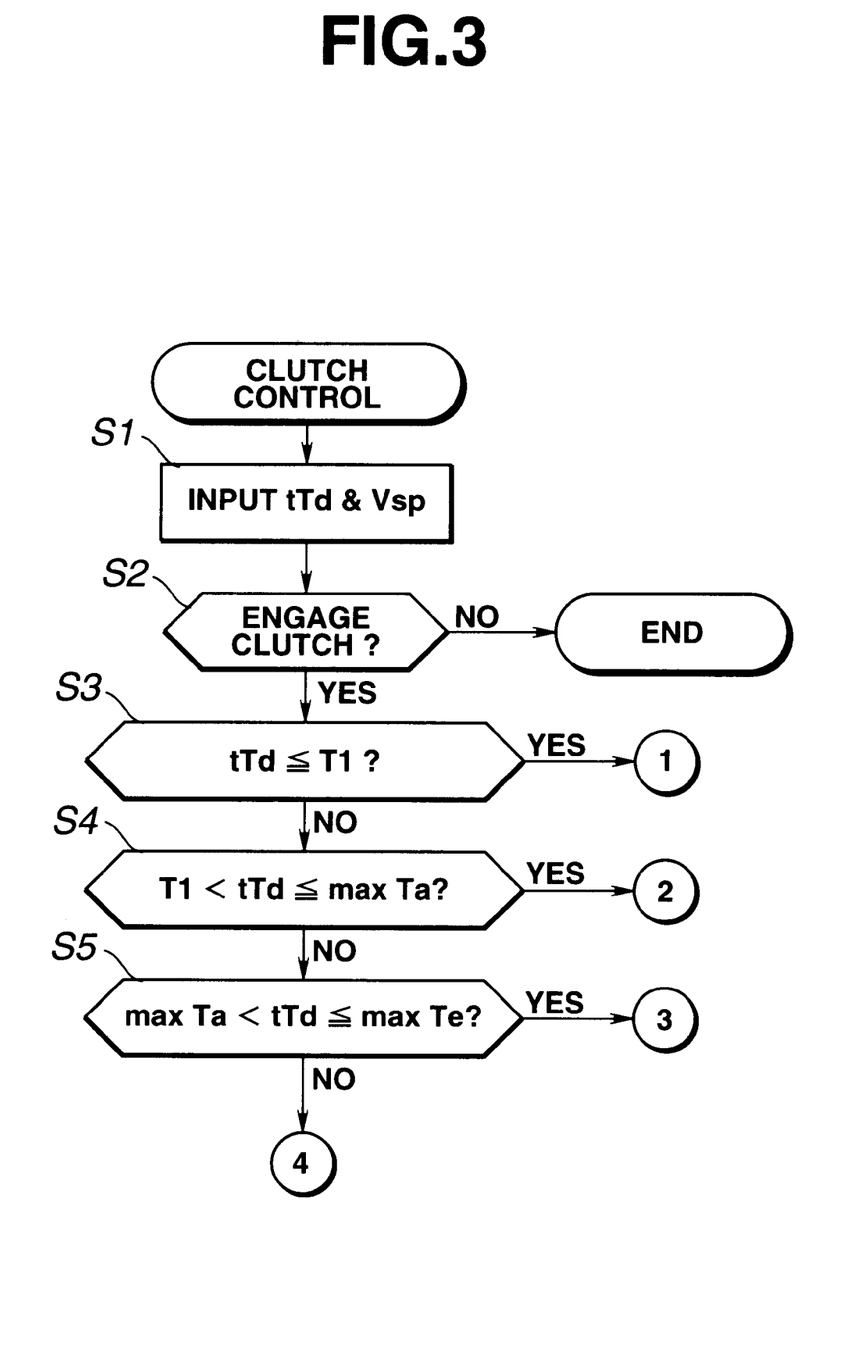
FIG. 3 is a very simplified flow chart of a clutch engagement command generation and logic flow distribution portions of the operation.

Referring to FIG. 2, the controller 16 is connected to a key switch 20 and a select lever switch 21. The key switch 20 is closed or turned on when the vehicle key is place to "ON" position or "START" position. In the select lever switch 21, "P", "N", "R" and "D" switches are closed or turned on when a select lever is positioned to Park (P), Neutral (N), Reverse (R) and Drive (D) positions, respectively.

An accelerator sensor 22, a brake switch 23, a vehicle speed sensor 24, a battery temperature sensor 25, a battery state of charge (SOC) sensor 26, an engine speed sensor 27 and a throttle sensor 28 are connected to the controller 16. The accelerator sensor 21 senses the depression degree θ of an accelerator pedal. The brake switch 23 is turned on when a brake pedal is depressed. The vehicle speed sensor 24 senses a predetermined parameter indicative of the vehicle speed Vsp. In this preferred embodiment, the predetermined parameter is the speed of rotation of the output shaft of the CVT 5. The battery temperature sensor 25 senses temperature Tb of the battery 15. The SOC sensor 26 senses state of charge (SOC) of the battery 15. The engine speed sensor 27 senses a parameter indicative of speed of rotation Ne of the engine drive shaft 2a. The throttle sensor 28 senses degree of opening of the engine throttle valve.

Also illustrated in FIG. 2 are actuators to adjust fuel injection 30, ignition timing 31 and valve timing 32 of the engine 2. To power the controller 16, an auxiliary battery 33 is provided.

It should be appreciated that the select lever switch 21, accelerator sensor 22 and brake switch 23 sense the vehicle operator's desires relative to movement of the vehicle. With the same vehicle speed, the vehicle operator's torque request demand tTd is proportional to the depression degree θ of the accelerator pedal. With the same depression degree of the accelerator pedal, the vehicle operator's torque request demand tTd decreases as the vehicle speed Vsp increases. Thus, the vehicle operator's torque request demand tTd may be determined by table look-up operation of a map using the outputs of the accelerator sensor 22 and vehicle speed sensor 24. Those skilled in the art of automotive control technology may easily prepare such map. In the preferred embodiment, the controller 16 has the map and retrieval routine to determine a current value of the vehicle operator's torque request demand tTd.

The flow diagram of FIGS. 3–7 illustrates a clutch control routine of the preferred implementation of the present invention. In step S1, the controller 16 inputs information of the vehicle operator's torque request tTd and vehicle speed Vsp. In the next step S2, the controller 16 determines whether or not engagement of the clutch 3 is requested based on the torque request demand tTd and the vehicle speed Vsp. To make this determination, a predetermined decision table may be referred to using the torque request demand tTd and the vehicle speed Vsp. If, in step S2, the controller 16 determines not to engage the clutch 3, the routine ends. If, in step 2, the controller 16 determines to engage the clutch 3, the routine goes to step S3 and onwards.

Figure 7:
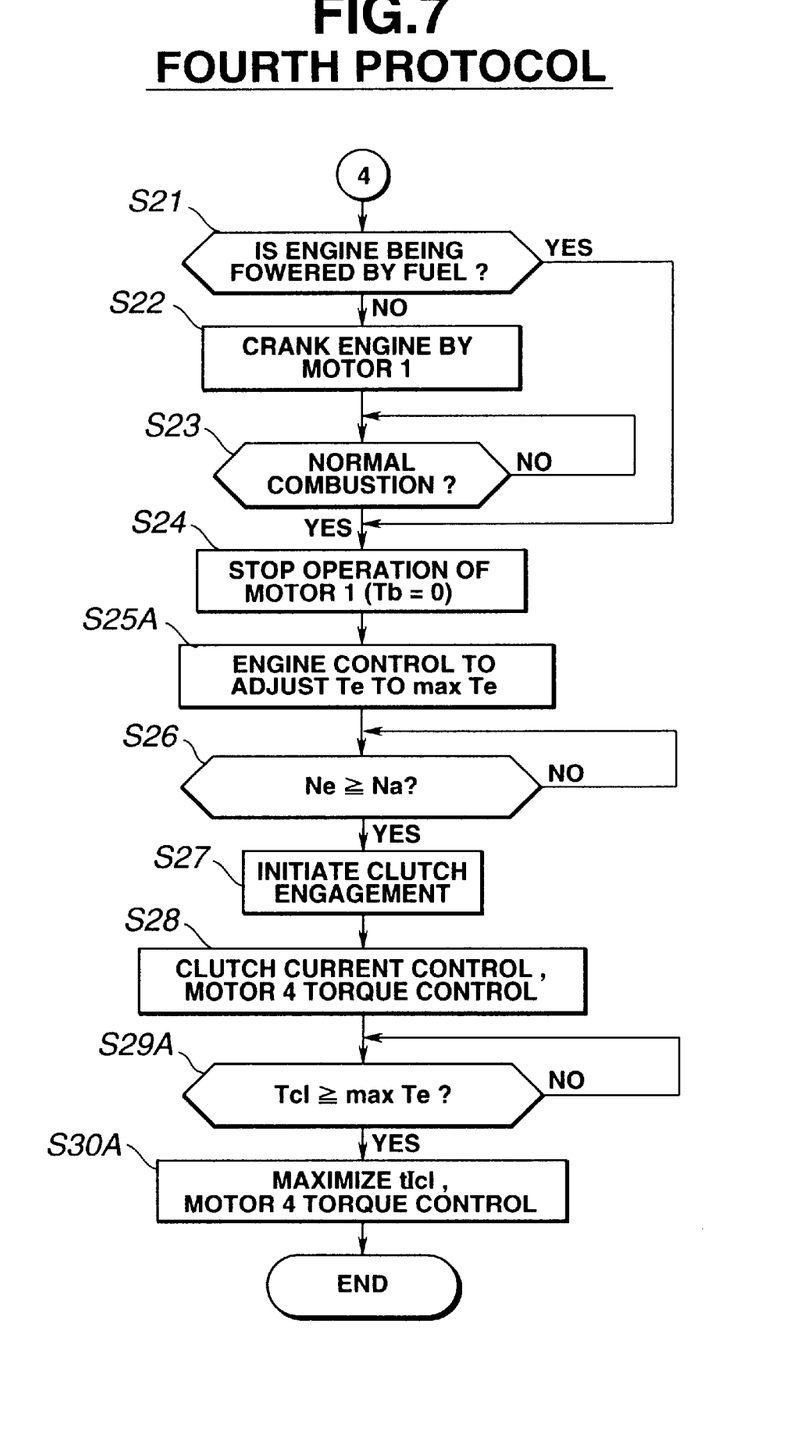
FIG. 7 is a flow chart of a fourth protocol portion of the operation.
Figure 8:
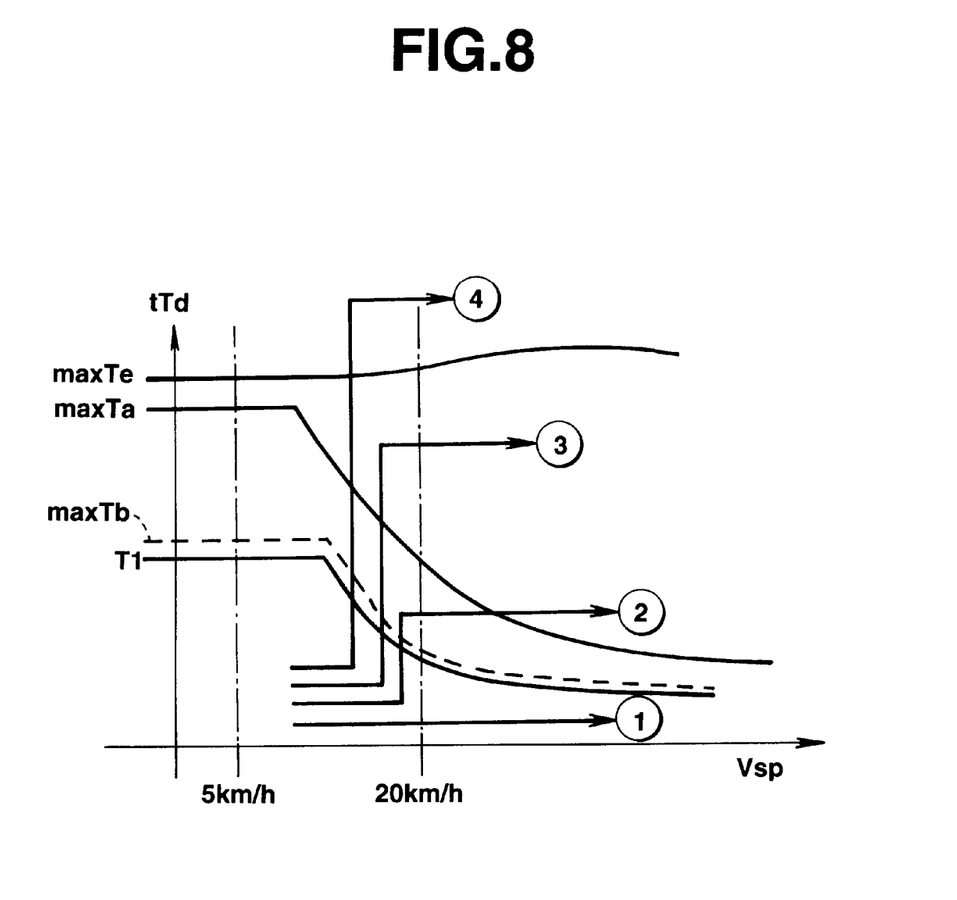
FIG. 8 illustrates data against varying vehicle speeds, which the vehicle operator's torque request demand is compared with in selecting one of protocols for operation to be initiated ba command o engage a clutch of the hybrid drive system.

In steps S3, S4 and S5, the torque request command tTd is compared with a predetermined value T1, a maximum torque maxTa of the motor 4 and a maximum torque maxTe of the engine 2. The maximum torque maxTa of the motor 4 is determined in response to specification of the motor 4, electric power that can be produced by the battery 15 and temperatures of the motor 4 and the inverter 12. FIG. 8 illustrates data of the maximum torque maxTa of the motor 4 against varying vehicle speeds Vsp, along with data of the maximum torque maxTe of the engine 2 and data of the predetermined value T1. The torque request demand tTd is compared with these data in selecting one of first to fourth protocols (see FIGS. 4–7) for operation to be initiated by a command to engage the clutch 3.

Prior to a command to engage the clutch 3, the clutch 3 is disengaged and the motor 4 provides motive drive force to the driven wheels 8 of the vehicle. Subsequently, upon or immediately after a command to engage the clutch 3, simply engaging the clutch 3 would result in combining the engine torque with the motor torque, causing a rapid increase in torque applied to the driven wheels 8 to produce substantial shock. Engaging the clutch 3 before synchronization between speed of rotation of the engine drive shaft 2a and speed of rotation of the motor 4 would result in production of substantial shock. In the preferred implementation of the clutch control routine, the engagement of the clutch 3 is initiated after the engine speed Ne has matched the motor speed Na of the motor 4. Reference should be made to step S16 in FIG. 4 and a moment t2 in FIGS. 9A–9C or step S26 in FIG. 6 and a moment t2 in FIGS. 11A–11C. Prior to initiation of the clutch engagement, the motor 1 absorbs torque produced by the engine 2 to prevent occurrence of shock.

During operation of the motor 1 to absorb the engine torque for engagement of the clutch 3, if it uses all of its capability to absorb the engine torque, the motor 1 cannot afford to speed control of the engine 2. Thus, in the preferred implementation, the motor 1 will not absorb the engine torque to a level as much as its maximum absorption torque maxTb. Instead, the motor 1 is permitted to absorb the engine torque to a level as indicated by the predetermined value T1 leaving room for the motor 1 to perform speed control of the engine 2. The predetermined value T1 is given by subtracting the magnitude of torque required for the speed control from a product (maxTb×Gb), where Gb is a ratio between speed of input shaft of the CVT 5 and speed of output shaft of the CVT 5. The dotted line in FIG. 8 illustrates the data of maximum absorption torque maxTb against varying vehicle speed Vsp. The maximum absorption torque maxTb is determined in response to specification of the motor 1, electric power that can be produced by the battery 15 and temperatures of the motor 1 and the inverter 11.

Figure 4:
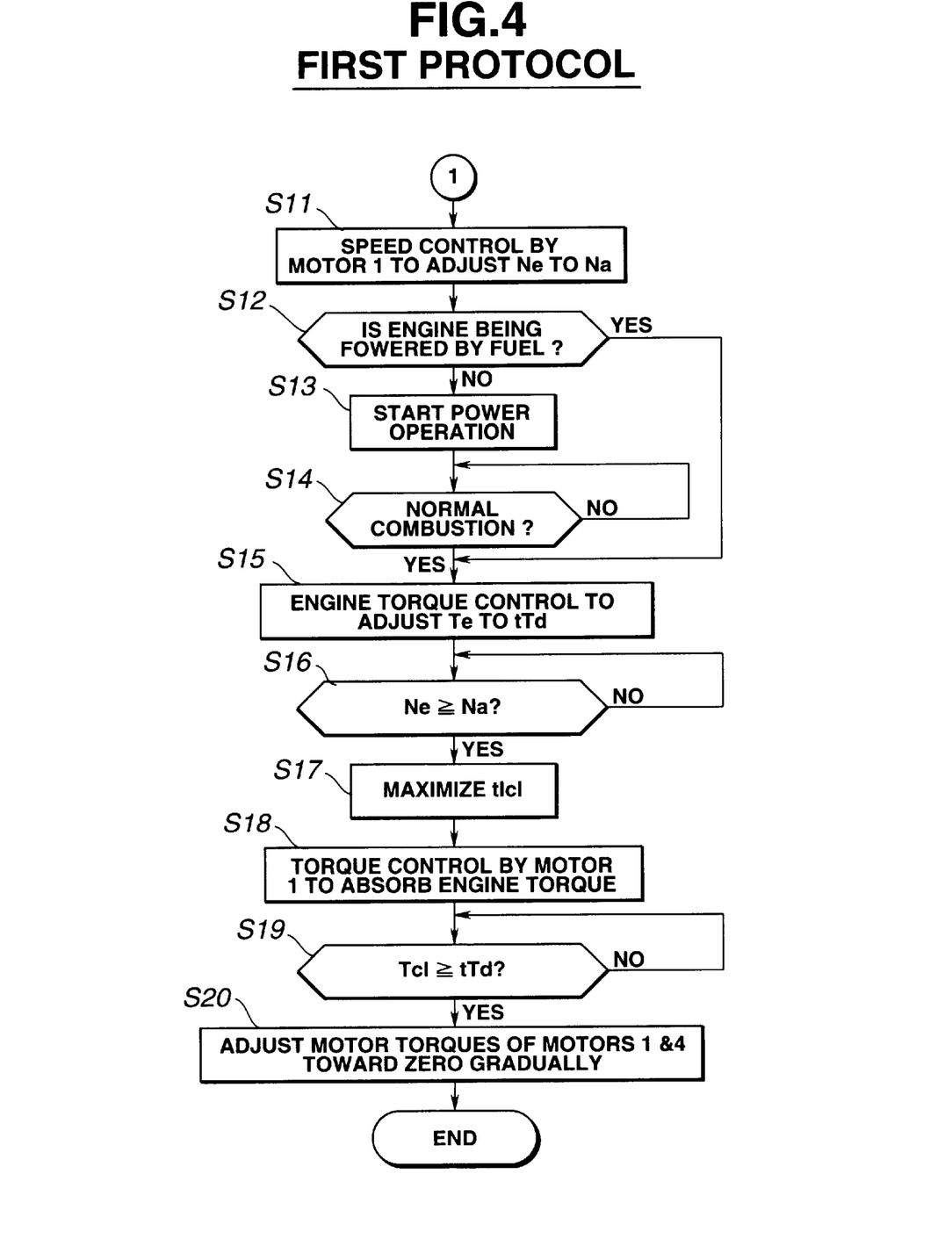
FIG. 4 is flow chart of a first protocol portion of a transient operation initiated by a command to engage a clutch.
Figure 5:
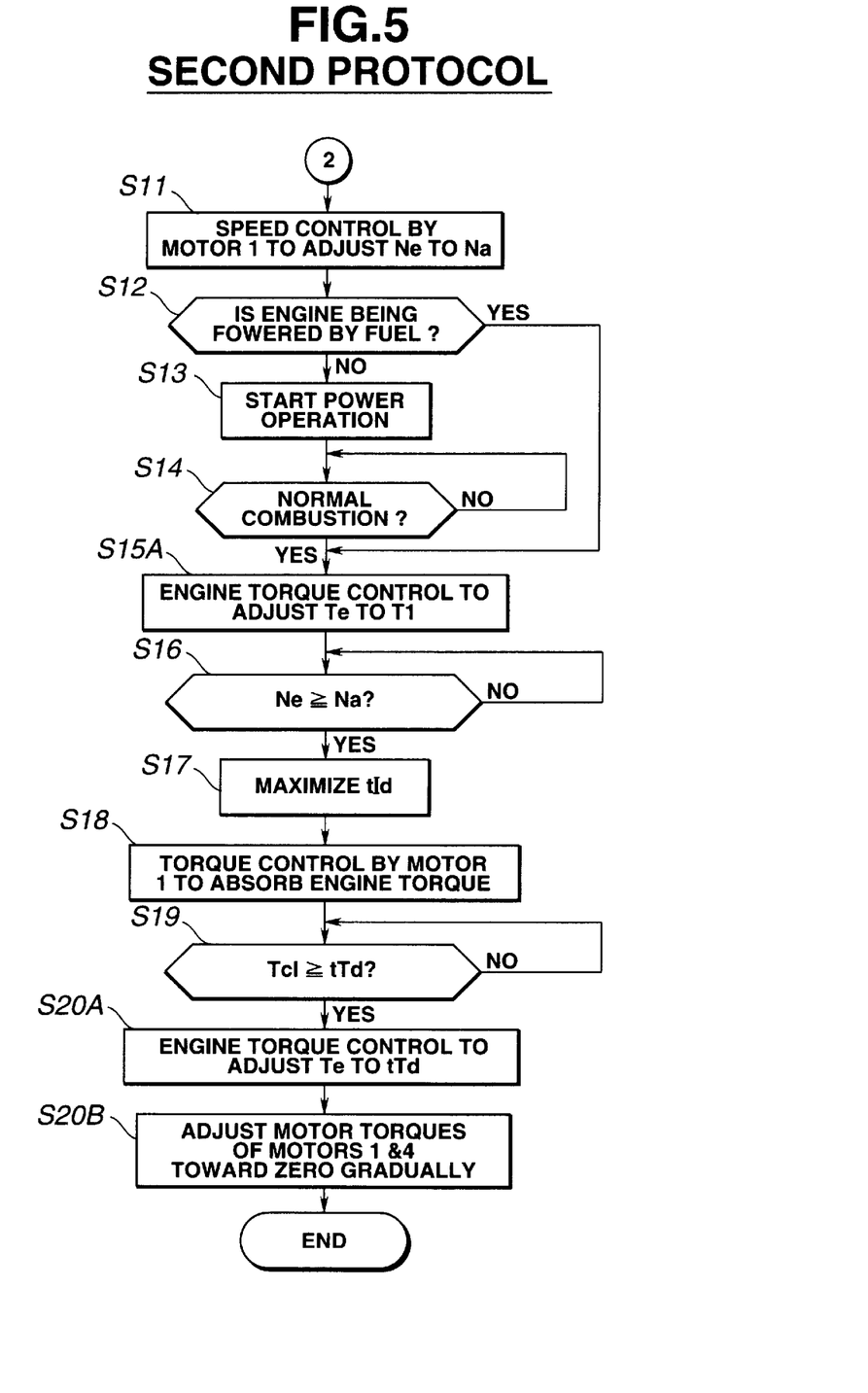
FIG. 5 is a flow chart of a second protocol portion of the operation.
Figure 6:
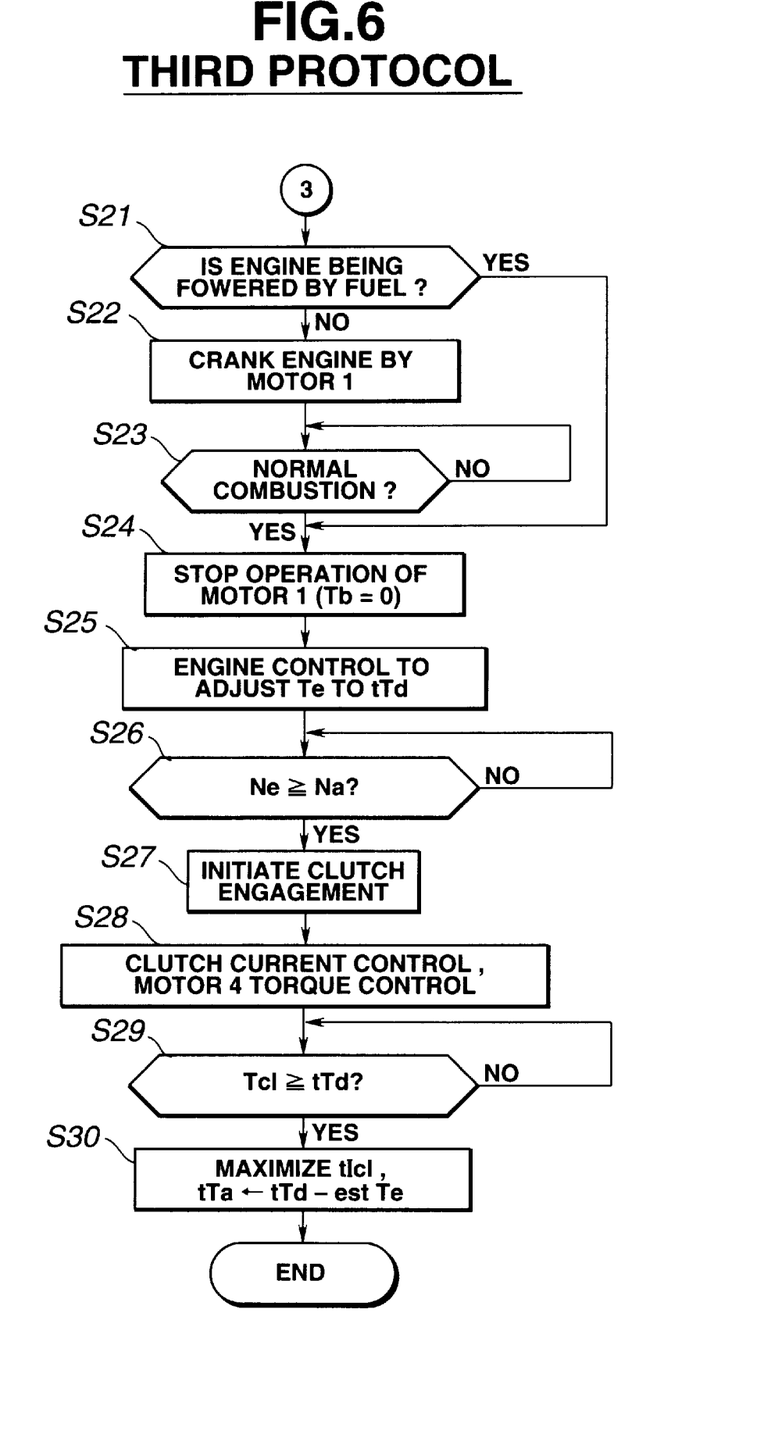
FIG. 6 is a flow chart of a third protocol portion of the operation.

Turning back to FIGS. 3 and 8, if, in step S3, the torque request demand tTd is less than or equal to the predetermined value T1, the routine jumps to the flow chart shown in FIG. 4 illustrating the first protocol. If, in step S4, the torque request demand tTd is greater than the predetermined value T1 but less than or equal to the maximum torque maxTa of the motor 4, the routine jumps to the flow chart shown in FIG. 5 illustrating the second protocol. If, in step S5, the torque request demand tTd is greater than the maximum torque maxTa of the motor 4 but less than or equal to the maximum torque maxTe of the engine 2, the routine jumps to the flow chart shown in FIG. 6 illustrating the third protocol. If, in step S5, the torque request demand tTd is greater than the maximum torque maxTe of the engine 2, the routine jumps to the flow chart shown in FIG. 7 illustrating the fourth protocol. It should be noted that the controller 16 performs a table look-up operation FIG. 8 using vehicle speed Vsp in retrieving data of the predetermined value T1, the maximum torque maxTa of the motor 4 and the maximum torque maxTe of the engine 2.

Figure 9A:
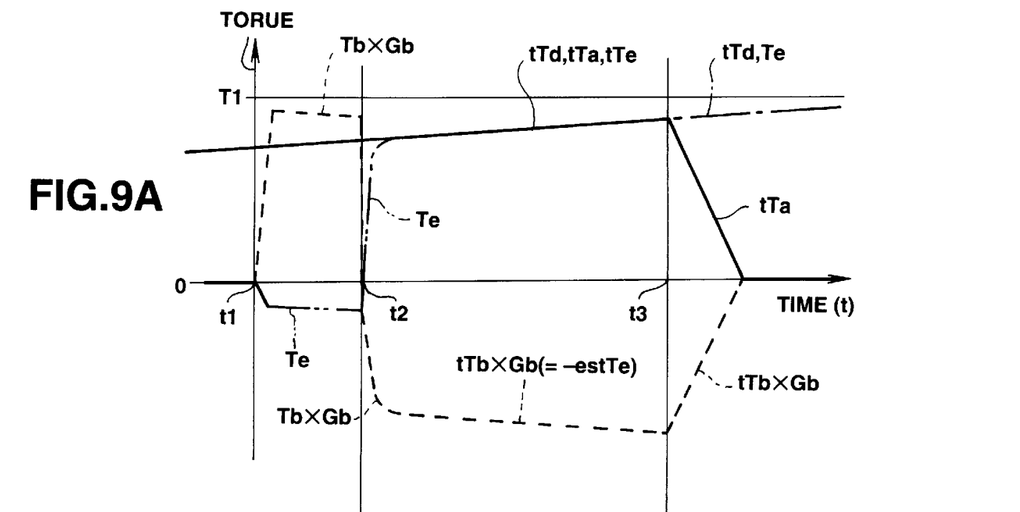
FIGS. 9A, 9B and 9C illustrate a first protocol for operation of the clutch in cooperation with operation of first and second electric motors and a heat engine.
Figure 9B:
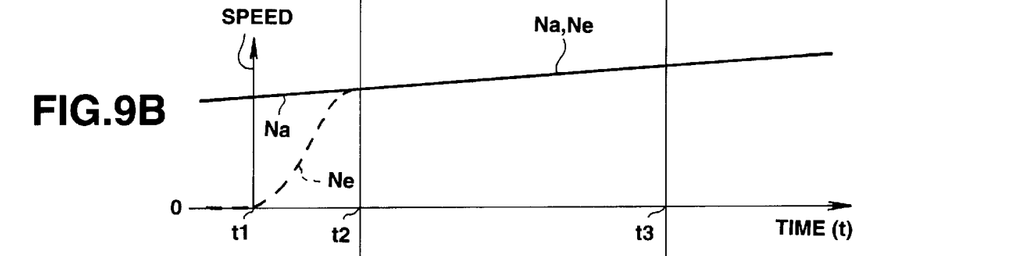
Figure 9C:
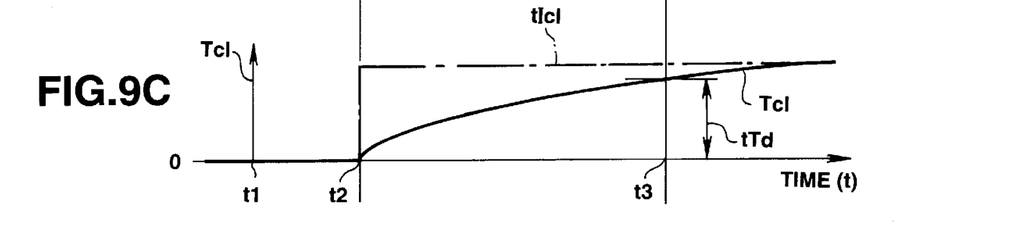
Figure 10A:
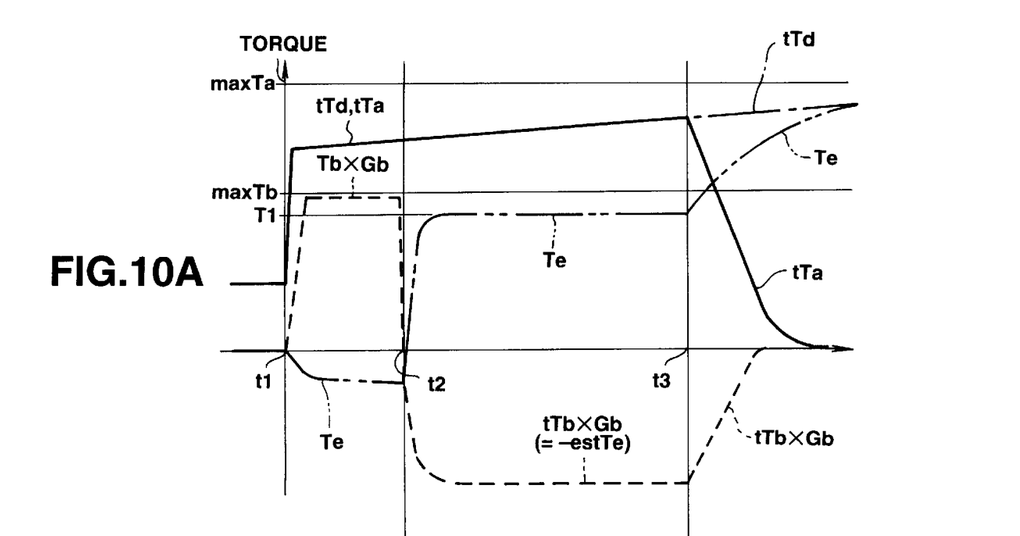
FIGS. 10A, 10B and 10C illustrate a second protocol for operation of the clutch cooperation with operation of the first and second electric motors and the heat engine.
Figure 10B:
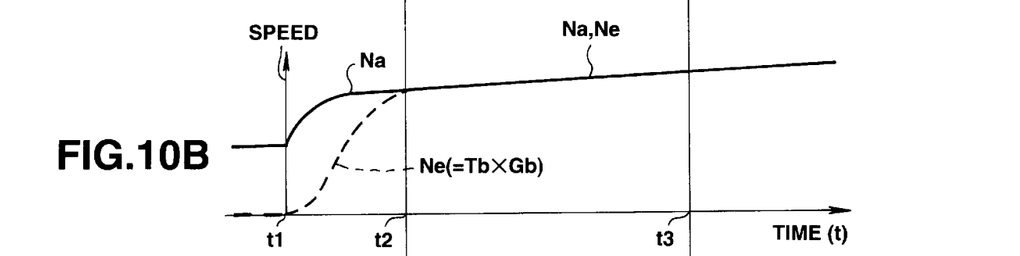
Figure 10C:
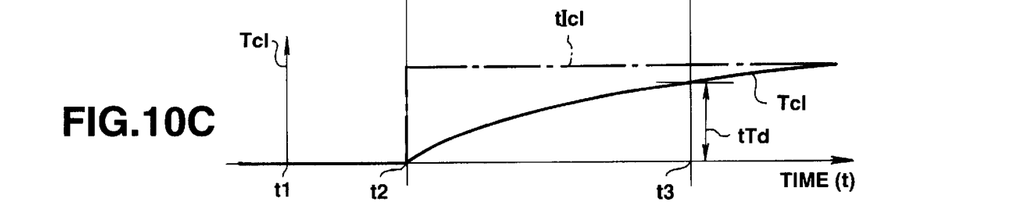

FIG. 4 illustrates the first protocol for operations of the first and second motors 4 and 1 and the engine 2 after a command to engage the clutch 3 if the torque request command tTd is less than or equal to T1. FIGS. 9A to 9C are time charts illustrating the first protocol. FIG. 9A illustrates variations of torque request demand tTd, toque Te of the engine 2, estimated torque estTe of the engine 2, target torque tTa of the motor 4, and target torque tTb of the motor 1. FIG. 9B illustrates variations of speed of rotation Na [rpm] of the motor 4, and speed of rotation Ne [rpm] of the engine 2. FIG. 9C illustrates variations of energizing current command tIcl of the clutch 3 and torque transmission capacity Tcl by the clutch 3. It should be noted that the torque transmission capacity Tcl that increases from a moment t2 in FIG. 9C does not mean that torque is actually transmitted by the clutch 3.

Referring to FIG. 4 and FIGS. 9A–9C, the first protocol when tTd ≦ T1 is explained.

In FIGS. 9A–9C, let it be assumed that there is a command to engage the clutch 3 at a moment t1. In the preferred implementation of the present invention, the clutch 3 transmits no torque until completion of its engagement at a moment t3. Thus, the torque control of the motor 4 where the torque request demand tTd is set as a target value tTa continues until the clutch 3 is completely engaged at the moment t3. Upon or immediately after the moment t1, in step S11 in FIG. 4, the controller 16 performs speed control by the motor 1 to adjust the engine speed Ne to the motor speed Na of the motor 4. In the next step S12, the controller 16 determines whether or not the engine 2 is being powered by fuel. If this is the case, the routine goes to step S15. If, in step S12, it determines that the engine 1 is not being powered by fuel, the controller 16 initiates, in step S13, power operation of the engine 2. In step S14, the controller 16 determines whether or not normal combustion takes place. This step S14 is repeated until normal combustion takes place. After step S14, the routine goes to step S15.

In step S13, the controller.16 activates the fuel injection 30 and ignition timing 31 to conduct fuel injection and spark ignition to start and sustain power operation of the engine 2. In the next step S14, the controller determines whether or not normal combustion takes place in the engine 2. If, in step S14, the controller 16 determines that normal combustion has taken place, the routine goes to step S15.

In step S15, the controller 16 performs torque control of the engine 2 by setting the torque request demand tTd as the target engine torque tTe. Concurrently with this engine torque control, the speed control by the motor 1 continues, thus causing the motor 1 to absorb the torque Te produced by the engine 2. For the engine torque control, an engine torque map is prepared, which contains different values of engine torque against varying engine speeds and throttle opening degrees. Reference is made to this engine torque map to give a target throttle opening degree for a combination of current engine speed and a target engine torque. The controller 16 performs a throttle control to adjust the engine throttle valve to accomplish the target throttle opening.

In the next step S16, the controller 16 determines whether or not the engine speed Ne has become greater than or equal to the speed Na of the motor 4. In other words, the controller determines whether or not the input shaft speed of the clutch 3 has matched the output shaft speed thereof. If this is the case, the routine goes to step S17. In step S17, the controller 16 increases a command value tIcl of clutch energizing current to its maximum, thereby to initiate engagement of the clutch 3. The energizing circuit for the clutch 3 provides a delay so that the torque transmitting capacity Tcl increases gradually. Referring to FIGS. 9B and 9C, at a moment t2, there is an increase in command value tIcl of clutch energizing current to its maximum upon the engine speed Ne has matched the motor speed Na.

After step S17, the routine goes to step S18. In step S18, the controller 16 performs torque control of the motor 1 by setting as the target torque tTb×Gb the product of an estimated value of engine torque (estTe) and minus one (−1). In the preferred implementation, the estimated value of engine torque is given after retrieving the engine torque map using engine speed and throttle opening degree. It should be appreciated that the engine torque may be estimated from cylinder pressure of the engine or from intake air flow and engine speed.

In step S19, the controller 16 determines whether or not the clutch transmission torque Tel has become greater than or equal to the torque request demand tTd. If, in step S19, the clutch transmission torque tTd has reached the torque request demand tTd at a moment t3 (see FIG. 9C), the routine goes to step S20. In step S20, the controller 16 adjusts the target torque tTb×Gb of the motor 1 and the target torque tTa of the motor 4 toward zero in a gradual manner such that a change in tTb×Gb offsets a change in tTa.

The target torque of each of the motors 4 and 1 should be adjusted toward zero in a manner to always hold the relationship expressed as follows:

$$estTe + tTa + tTb \times Gb = tTd \tag{1}$$

The reduction rates should be set based on consideration of resonant frequency of the clutch 3 and damping coefficient thereof. The torque control of the engine 2 to adjust the engine torque Te toward the torque request demand tTd continues thereafter.

FIG. 5 and FIGS. 10A–10C illustrate the second protocol when T1 < tTd ≦ maxTa. The flow diagram shown in FIG. 5 is substantially the same as that shown in FIG. 4 so that the same reference numerals are used in these flow diagrams to designate the same steps. It should be appreciated that the step S15 in FIG. 4 has been replaced by step S15A in FIG. 5 and the step S20 in FIG. 4 has been replaced by steps S20A and S20B in FIG. 5. Comparing FIGS. 10A–10C with FIGS. 9A–9C reveals that the torque control of the engine 2 according to the second protocol is different from the torque control of the engine 2 according to the first protocol. Specifically, the target torque tTe is set equal to the predetermined value T1 between the moment t2 and the moment t3. The target torque tTe is set equal to the torque request demand tTd after the moment t3.

In step S15A in FIG. 5, the controller 16 performs the torque control of the engine by setting the predetermined value T1 as the target engine torque tTe. Concurrently with this engine torque control, the speed control by the motor 1 continues, thus causing the motor 1 to absorb the torque Te produced by the engine 2. The motor 1 can afford to the speed control of the engine 2 because the target engine torque tTe is equal to the predetermined value T1.

Upon or immediately after completion of engagement of the clutch 3 at moment t3, the controller 16 sets, in step S20A, the torque request command tTd as the target engine torque tTe to perform the torque control of the engine 2. In step S20B, in response to an increase in engine torque Te (estimated value estTe), the controller 16 adjusts the target torque tTb×Gb and the target torque tTa toward zero in a manner as to hold the relationship as expressed by the equation (1).

FIG. 6 and FIGS. 11A–11C illustrate the third protocol when maxTa<tTd≦maxTe.

In this case, the torque request demand tTd is greater than the maximum torque maxTa of the motor 4. The controller 16 performs the torque control of the motor 4 by setting the maximum torque maxTa as the target torque tTa until the transmission torque capacity Tcl rises at moment t2 after occurrence of a command to engage the clutch 3 at moment t1. In this manner, the motor 4 is operated to produce the maximum torque maxTa over the interval t1–t2.

Under this condition where the torque request demand tTd is greater than the maximum torque maxTa of the motor 4, the speed control by the motor 1 is not carried out upon or immediately after the occurrence of a command to engage the clutch at moment t1. The motor 1 is used to start the engine 2 immediately after the moment t1. In step S21, the controller 16 determines whether or not the engine 2 is being powered by fuel. If, in step S21, the engine is not being power by fuel, the routine goes to step S22. In step S22, the motor 1 drives to start the engine 2 at its maximum torque. If, in step S21, the engine 2 is being powered by fuel, the routine goes to step S24. After step S22, the routine goes to step S23. In step S23, the controller 16 determines whether or not normal combustion occurs in the engine 2. If this is the case, the routine goes to step S24. In step S24, the controller 16 sets the target torque of the motor 1 equal to zero (at moment t2' in FIG. 11A. After step S24, the routine goes to step S25.

In step S25, the controller 16 performs the torque control of the engine 2 by setting, as the target engine torque tTe, the torque request command tTd. In the next step S26, the controller 16 determines whether or not the engine speed Ne has become greater than or equal to the motor speed Na of the motor 4. If, in step S26, the engine speed Ne exceeds the motor speed Na, the routine goes to step S27. In step S27, the controller 16 initiates engagement of the clutch 3 (at moment t2 in FIG. 11C). Because the motor 1 does not carry out the speed control of the engine, rapid engagement of the clutch 3 would result in an unacceptable increase in engine speed Ne from the motor speed Na of the motor 4. In order to suppress this increase in engine speed Ne, the controller 16 adjusts the command value tIcl of clutch energizing current to suppress the increase in engine speed Ne to converge the engine speed Ne toward the motor speed Na.

As discussed before, when the torque request command tTd is less than the maximum torque maxTa of the motor 4, the command value tIcl of the clutch energizing current changes to the maximum level upon initiation of engagement of the clutch 3 at moment t2. Thus, the clutch 3 is engaged quickly. However, in the case where the torque request demand tTd is greater than the maximum torque maxTa, the controller 16 adjusts the command value tIcl in such a manner as to bring the engine speed Ne into convergence with the motor speed Na by suppressing the increase in engine speed. This control continues until the clutch transmission torque capacity Tcl becomes greater than or equal to the torque request command tTd. Thus, the clutch 3 is held in less firm engagement state for control of the engine speed Ne.

In step S28, the controller performs torque control of the motor 4, too. The target torque tTa is set as follows:

If $Ne>Na$, then $tTa=tTd-Tcl$.

If $Ne<Na$, then $tTa=tTd+Tcl$.

If $Ne=Na$, then $tTa=tTd-estTe$ (2)

Figure 11A:
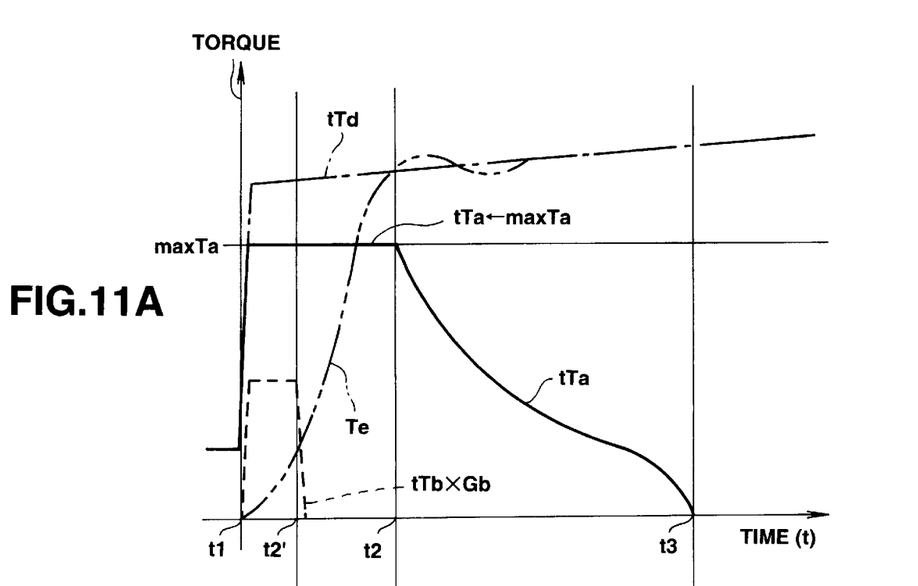
FIGS. 11A, 11B and 11C illustrate a third protocol for operation of the clutch in cooperation with operation of the first and second electric motors and the heat engine.
Figure 11B:
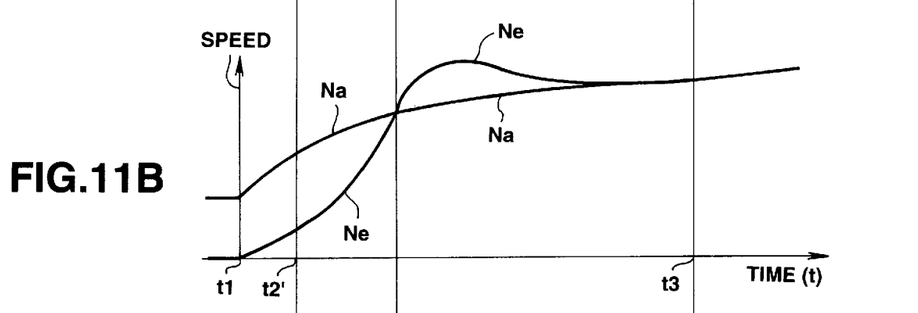
Figure 11C:
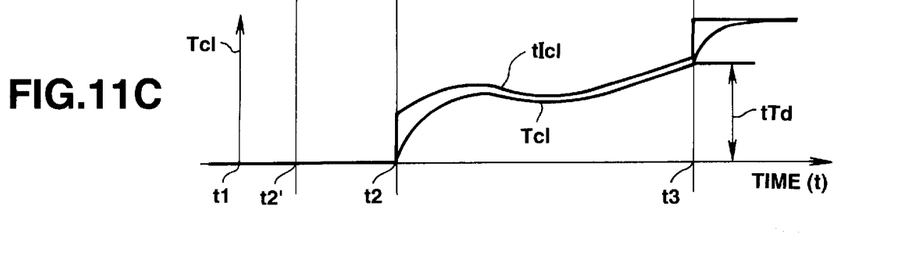

In this manner, as shown in FIGS. 11A and 11C, the target torque tTa of the motor 4 decreases in response to increase in the clutch torque transmission capacity Tcl. After step S28, the routine goes to step S29.

In step S29, the controller 16 determines whether or not the clutch torque transmission capacity Tcl is greater than or equal to the torque request demand tTd. If, in step S29, the clutch torque transmission capacity Tcl has reached the torque request demand tTd (at moment t3 in FIG. 11C), the routine goes to step S30. In step S30, the controller 16 maximizes the command value tcl of clutch energizing current and sets the target torque tTa of the motor 4 equal to (tTd−estTe).

FIG. 7 illustrates the fourth protocol when maxTe<tTd. The flow diagram shown in FIG. 7 is substantially the same as that shown in FIG. 6 so that the same reference numerals are used in these flow diagrams to designate the same steps. It should be appreciated that the step S25 in FIG. 6 has been replaced by step S25A in FIG. 7 and the steps S29 and S30 in FIG. 6 have been replaced by steps S29A and S30A in FIG. 7.

In step S25A in FIG. 7, the controller 16 performs the torque control of the engine 2 by setting the maximum torque maxTe of the engine 2 as the target engine torque tTe. According to this fourth protocol, the controller 16 determines, in step S29A, whether or not the clutch torque transmission capacity Tcl has become greater than or equal to the maximum torque maxTe of the engine 2. If this is the case, the routine goes to step S30A. In step S30A, the controller 16 maximizes the command value tIcl of clutch energizing current and performs torque control of the motor 4 to compensate for a shortage (tTd−maxTe).

The content of disclosure of Japanese Patent Application No. 10-189394 (filed Jul. 3, 1998) is hereby incorporated by reference in its entirety.

The above-described implementation of the present invention is an example implementation. Moreover various modifications to the present invention may occur to those skilled in the art and will fall within the scope of the present invention as set forth below.

What is claimed is:

1. A hybrid drive system for a vehicle, comprising:

at least one driven wheel;

a first electric motor having a first rotor in driving relationship to said driven wheel;

a fuel powered heat engine having an engine drive shaft;

a second electric motor having a second rotor in driving connection to said engine drive shaft, a clutch to engage and disengage said heat engine to and from said first rotor; and a controller for translating the vehicle operator's torque request demand into operation of said first electric motor, said second electric motor and said clutch in response to a command to engage said clutch.

2. The hybrid drive system as claimed in claim 1, further comprising:

a sensor positioned in the vehicle to sense the vehicle operator's desire relative to movement of the vehicle, wherein said controller is operative to translate the sensed vehicle operator's desire into the vehicle operator's torque request demand.

3. The hybrid drive system as claimed in claim 1, further comprising:

a first sensor positioned in the vehicle to sense the vehicle operator's desire relative to movement of the vehicle; and a second sensor positioned in the vehicle to sense a predetermined parameter indicative of the speed of rotation of said driven wheel, wherein said controller is operative to determine the vehicle operator's torque request demand which corresponds to the sensed vehicle operator's desire and the sensed speed of rotation of said driven wheel.

4. The hybrid drive system as claimed in claim 3, wherein said controller has data of maximum input torque, with which said second motor is capable, with its full power, of absorbing from said engine drive shaft, against varying speeds of rotation of said driven wheel, and data of maximum output torque, which said first motor is capable, with its full power, of producing, against the varying speeds of rotation of said driven wheel, wherein said controller is operative to retrieve said data of said maximum input torque and said data of maximum output torque in response to the sensed speed of rotation of said driven wheel for comparison with the vehicle operator's torque request command, wherein said controller has a plurality of different protocols for operation of said first and second motors and operation of said clutch for transient period beginning with the command to engage said clutch, wherein said controller is operative to select one of said plurality of different protocols in response to result of said comparison.

5. A hybrid drive system for a vehicle, comprising:

at least one driven wheel;

a first electric motor having a first rotor in driving relationship to said driven wheel via a transmission;

a fuel powered heat engine having an engine drive shaft;

a second electric motor having a second rotor in driving connection to said engine drive shaft, a clutch between said engine drive shaft and said first rotor; and a controller for generating a command to engage said clutch in response to the vehicle operator's torque request demand and the vehicle speed, comparing the vehicle operator's torque request demand with the maximum input torque by said second electric motor and the maximum output torque by said first electric motor, and controlling operation of the procedure of engagement of said clutch beginning with said command in response to result from said comparison.

6. The hybrid drive system as claimed in claim 5, wherein, when the vehicle operator's torque request demand is less than the maximum output torque of said first electric motor, said controller is operative to perform torque control of said first electric motor to adjust torque to the vehicle operator's torque request command until completion of engagement of said clutch.

7. The hybrid drive system as claimed in claim 6, wherein, when the vehicle operator's torque request demand is less or equal to a predetermined value that is less than the maximum input torque of said second electric motor, said controller is operative to control said second electric motor to perform speed control of said engine to adjust speed of said drive shaft to speed of said first rotor of said first electric motor and to perform torque control of said engine to adjust its torque to the vehicle operator's torque request demand until the speed of said drive shaft matches the speed of said first rotor of said first electric motor, and said controller is operative to initiate engagement of said clutch when the speed of said drive shaft matches the speed of said first rotor of said first electric motor.

8. The hybrid drive system as claimed in claim 7, wherein said controller is operative to control said second electric motor in such a manner as to absorb torque generated by said engine after the initiation of engagement of said clutch.

9. The hybrid drive system as claimed in claim 8, wherein said controller is operative to adjust torque generated by said second electric motor and torque generated by said first electric motor toward zero in a manner to effect each other after the completion of engagement of said clutch.

10. The hybrid drive system as claimed in claim 6, wherein, when the vehicle operator's torque request demand is greater than a predetermined value that is less than the maximum input torque of the second electric motor and less than or equal to the maximum output torque of said first electric motor, said controller is operative to control said second electric motor to perform speed control of said engine to adjust speed of said drive shaft to speed of said first rotor of said first electric motor and to perform torque control of said engine to adjust its torque to said predetermined value until the speed of said drive shaft matches the speed of said first rotor of said first electric motor, and said controller is operative to initiate engagement of said clutch when the speed of said drive shaft matches the speed of said first rotor of said first electric motor.

11. The hybrid drive system as claimed in claim 10, wherein said controller is operative to control said second electric motor in such a manner as to absorb torque generated by said engine after the initiation of engagement of said clutch.

12. The hybrid drive system as claimed in claim 11, wherein, after the completion of engagement of said clutch, said controller is operative to adjust torque generated by said second electric motor and torque generated by said first electric motor toward zero in a manner to hold the relationship wherein sum of torque of said engine, torque of said second electric motor and torque of said first electric motor matches the vehicle operator's torque request demand.

13. The hybrid drive system as claimed in claim 5, wherein, when the vehicle operator's torque request demand is greater than the maximum output torque of said first electric motor, the controller is operative to perform torque control of said first electric motor to adjust its torque to the maximum until initiation of engagement of said clutch.

14. The hybrid drive system as claimed in claim 13, wherein, when the vehicle operator's torque request demand is less than or equal to the maximum output torque of said engine, said controller is operative to perform torque control of said engine to adjust its torque to the vehicle operator's torque request demand until the speed of said drive shaft of said engine exceeds the speed of said first rotor of said first electric motor, and to initiate engagement of said clutch after the speed of said drive shaft of said engine has exceeded the speed of said first rotor of said first electric motor.

15. The hybrid drive system as claimed in claim 14, wherein, after the initiation of engagement of said clutch, said controller is operative to adjust torque transmission capacity of said clutch to bring the speed of said drive shaft of said engine into convergence with the speed of said first rotor of said first electric motor and to perform torque control of said first electric motor to adjust its torque to a value resulting from subtraction of the torque transmission capacity from the vehicle operator's torque request demand.

16. The hybrid drive system as claimed in claim 15, wherein, after the completion of engagement of said clutch, said controller is operative to perform torque control of said first electric motor to adjust its torque in such a manner as to hold the relationship wherein sum of torque of said engine, and torque of said first electric motor matches the vehicle operator's torque request demand.

17. The hybrid drive system as claimed in claim 13, wherein, when the vehicle operator's torque request demand is greater than the maximum output torque of said engine, said controller is operative to perform torque control of said engine to adjust its torque to the maximum until the speed of said drive shaft of said engine exceeds the speed of said first rotor of said first electric motor, and to initiate engagement of said clutch after the speed of said drive shaft of said engine has exceeded the speed of said first rotor of said first electric motor.

18. The hybrid drive system as claimed in claim 17, wherein, after the initiation of engagement of said clutch, said controller is operative to adjust torque transmission capacity of said clutch to bring the speed of said drive shaft of said engine into convergence with the speed of said first rotor of said first electric motor and to perform torque control of said first electric motor to adjust its torque to a value resulting from subtraction of the torque transmission capacity from the vehicle operator's torque request demand.

19. The hybrid drive system as claimed in claim 18, wherein after the completion of engagement of said clutch, said controller is operative to perform torque control of said first electric motor to adjust its torque to a value resulting from subtraction of the maximum output torque of said engine from the vehicle operator's torque request demand.

20. A hybrid drive system for a vehicle, comprising:

at least one driven wheel;

a first electric motor having a first rotor in driving relationship to said driven wheel;

a fuel powered heat engine having an engine drive shaft;

a second electric motor having a second rotor in driving connection to said engine drive shaft, a clutch to engage and disengage said heat engine to and from said first rotor; and means for translating the vehicle operator's torque request demand into operation of said first electric motor, said second electric motor and said clutch in response to a command to engage said clutch.

21. A method of operating a vehicle hybrid drive system including an electric motor in driving relationship to a driven wheel, a heat engine, and a clutch to engage and disengage the heat engine to and from the electric motor, comprising:

sensing vehicle operator's desire relative to movement of the vehicle;

translating the sensed vehicle operator's desire into vehicle operator's torque request demand;

generating a command to engage the clutch; and translating the vehicle's operator torque request demand into operation of the engine, operation of the electric motor and operation of the clutch during transient period beginning with said command to engage the clutch.

* * * * *